US012595016B2

(12) United States Patent (10) Patent No.: US 12,595,016 B2
Inoue et al. (45) Date of Patent: Apr. 7, 2026

(54) NOTIFICATION SYSTEM, NOTIFICATION METHOD, AND COMPUTER PROGRAM

(71) Applicant: YAMAHA HATSUDOKI KABUSHIKI KAISHA, Iwata (JP)

(72) Inventors: Ryuji Inoue, Shizuoka (JP); Kazuya Arimatsu, Shizuoka (JP); Nanami Mitsunari, Schiphol-Rijk (NL); Masaki Sato, Shizuoka (JP); Gakuto Hoshida, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 53 days.

(21) Appl. No.: 18/928,636

(22) Filed: Oct. 28, 2024

(65) Prior Publication Data

US 2025/0136226 A1 May 1, 2025

(30) Foreign Application Priority Data

Oct. 30, 2023 (JP) ................................. 2023-185885

(51) Int. Cl.
| | |
|---|---|
| *B62J 50/22* | (2020.01) |
| *B62J 3/10* | (2020.01) |
| *B62J 6/22* | (2020.01) |
| *B62J 45/20* | (2020.01) |
| *B62J 45/412* | (2020.01) |

(Continued)

(52) U.S. Cl.
CPC ................. *B62J 50/22* (2020.02); *B62J 3/10* (2020.02); *B62J 6/22* (2020.02); *B62J 45/20*

(2020.02); *B62J 45/412* (2020.02); *G07C 5/008* (2013.01); *G07C 5/04* (2013.01)

(58) Field of Classification Search
CPC . B62J 50/22; B62J 45/412; B62J 45/20; B62J 3/10; B62J 6/22; G07C 5/008; G07C 5/04
See application file for complete search history.

(56) References Cited

U.S. PATENT DOCUMENTS

| | | | |
|---|---|---|---|
| 5,335,188 A | 8/1994 | Brisson | |
| 2011/0084822 A1 | 4/2011 | Li | |
| 2015/0367176 A1 | 12/2015 | Bejestan et al. | |

(Continued)

FOREIGN PATENT DOCUMENTS

| | | |
|---|---|---|
| CN | 106275166 A | 1/2017 |
| CN | 106981209 A | 7/2017 |

(Continued)

*Primary Examiner* — Jacob M Amick
(74) *Attorney, Agent, or Firm* — Keating & Bennett, LLP

(57) ABSTRACT

A notification system for notifying a user of information on driving of a bicycle includes a processor and a storage to store a computer program to control an operation of the processor. The processor is configured or programmed to execute the computer program to acquire traveling speed information representing a traveling speed of the bicycle, perform a first count operation of counting a time duration in which a first state of the traveling speed not being higher than a first predetermined speed, is continued based on the traveling speed information, and in a case in which the first state has been continued for a first predetermined time duration, notify the user via a notifier of first information indicating that the driving of the bicycle by the user has been appropriate.

21 Claims, 8 Drawing Sheets

(51) Int. Cl.
   *G07C 5/00* (2006.01)
   *G07C 5/04* (2006.01)

(56) References Cited

U.S. PATENT DOCUMENTS

| | | |
|---|---|---|
| 2016/0350604 A1 | 12/2016 | Chen |
| 2022/0204110 A1* | 6/2022 | Silsby ...................... B62M 6/45 |
| 2023/0112258 A1 | 4/2023 | Higashi et al. |
| 2025/0108882 A1* | 4/2025 | Jordan .................... B62M 6/50 |

FOREIGN PATENT DOCUMENTS

| | | |
|---|---|---|
| DE | 20321185 U1 | 5/2006 |
| DE | 102016109401 A1 | 12/2016 |
| DE | 102022125938 A1 | 4/2023 |
| JP | 642554 B2 | 1/1989 |
| JP | 2007230411 A | 9/2007 |
| JP | 2014115089 A | 6/2014 |
| JP | 2018060299 A | 4/2018 |
| JP | 2019217978 A | 12/2019 |
| JP | 2020006744 A | 1/2020 |
| JP | 6884890 B2 | 6/2021 |
| JP | 6977234 B2 | 12/2021 |
| JP | 2022034425 A | 3/2022 |

* cited by examiner

NOTIFICATION SYSTEM, NOTIFICATION METHOD, AND COMPUTER PROGRAM

CROSS REFERENCE TO RELATED APPLICATIONS

This application claims the benefit of priority to Japanese Patent Application No. 2023-185885 filed on Oct. 30, 2023. The entire contents of this application are hereby incorporated herein by reference.

BACKGROUND OF THE INVENTION

1. Field of the Invention

The present invention relates to notification systems, notification methods, and non-transitory computer readable media including computer programs.

2. Description of the Related Art

Bicycles are widely used by a variety of people regardless of the age or gender as easy-to-use means of transportation. Recently, electrically assisted bicycles, by which power of users performing pedaling is assisted by electric motors, are increasingly common (see, for example, Japanese Laid-Open Patent Publication No. 2007-230411).

Such an electrically assisted bicycle causes the electric motor to generate drive power corresponding to the power of a human body, specifically, the power provided by a user to pedals, and thus alleviates the load imposed on the user while, for example, traveling on a slope or traveling with a cargo.

SUMMARY OF THE INVENTION

Bicycles such as electrically assisted bicycles are required to be run at an appropriate traveling speed. Users driving the bicycles are required to be made aware that the bicycles need to run at an appropriate traveling speed.

Example embodiments of the present invention disclose notification systems, notification methods, and non-transitory computer readable media including computer programs as described below.

A notification system for notifying a user of information on driving of a bicycle includes a processor and a storage to store a computer program to control an operation of the processor, wherein the processor is configured or programmed to execute the computer program to acquire traveling speed information representing a traveling speed of the bicycle; perform a first count operation of counting a time duration in which a first state of the traveling speed not being higher than a first predetermined speed, is continued; and in a case in which the first state has been continued for a first predetermined time duration, notify the user via a notifier of first information indicating that the driving of the bicycle by the user has been appropriate.

In the case in which the first state of the traveling speed of the bicycle not being higher than the first predetermined speed, has been continued for the first predetermined time duration, the user is notified that the driving has been appropriate. In the case in which the driving is continued at an appropriate traveling speed, the user is praised, so that the user's awareness to drive appropriately may be improved.

In the notification system above, the processor is configured or programmed to, in the case in which the traveling speed is increased to a speed higher than the first predetermined speed, perform a second count operation of counting a time duration in which a second state of the traveling speed being higher than the first predetermined speed, is continued, and in a case in which the second state has been continued for a second predetermined time duration, which is shorter than the first predetermined time duration, reset the time duration counted by the first count operation.

In the case in which the second state of the traveling speed of the bicycle being higher than the first predetermined speed, has been continued for the second predetermined time duration, the time duration counted by the first count operation is reset. With this arrangement, in the case in which the appropriate traveling speed is not maintained, the first information may be prevented from being notified.

In the notification system above, wherein in the case in which the traveling speed returns to a speed not higher than the first predetermined speed without the second state being continued for the second predetermined time duration, the processor is configured or programmed to not reset the time duration counted by the first count operation.

It may occur that the traveling speed is temporarily increased to a speed higher than the first predetermined speed against the user's intention when, for example, the bicycle travels down a slope or has a tailwind. In the case in which the second state did not continue for the second predetermined time duration, the counted time duration is not reset. With this arrangement, the criterion for determining whether or not the traveling speed has been appropriate may be prevented from being excessively strict.

In the notification system above, the processor is configured or programmed to stop performing the first count operation for a time duration in which the traveling speed is higher than the first predetermined speed, and perform the first count operation when the traveling speed is decreased to a speed not higher than the first predetermined speed.

The first count operation is stopped for the time duration in which the traveling speed is higher than the first predetermined speed. With this arrangement, such a time duration may be prevented from being included in the time duration in which the driving is performed at a appropriate traveling speed.

In the notification system above, the processor is configured or programmed to stop performing the first count operation for a time duration in which the traveling speed is lower than a second predetermined speed, which is lower than the first predetermined speed, and perform the first count operation when the traveling speed is increased to a speed not lower than the second predetermined speed and not higher than the first predetermined speed.

The first count operation is stopped for the time duration in which the traveling speed is lower than the second predetermined speed. With this arrangement, the time duration in which, for example, the bicycle is at a stop may be prevented from being included in the time duration in which the driving is performed at an appropriate traveling speed.

In the notification system above, wherein after resetting the time duration counted by the first count operation, the processor is configured or programmed to resume counting the time duration in which the first state is continued.

The count operation is resumed after the counted time duration is reset. With this arrangement, in the case in which the user continues driving at an appropriate traveling speed after that, the user may be notified that the driving has been appropriate.

In the notification system above, after notifying the user via the notifier of the first information, the processor is configured or programmed to resume counting the time duration in which the first state is continued.

The count operation is resumed after the first information is notified to the user. With this arrangement, in the case in which the user continues driving at an appropriate traveling speed after being notified of the first information, the first information may be notified to the user again.

In the notification system above, the processor is configured or programmed to make contents of the first information notified at a first time and contents of the first information notified at an nth time different from each other, where n is an integer of 2 or greater.

The contents of information notified at the nth time is different from the contents information notified at the first time. With this arrangement, the user's awareness to drive at an appropriate traveling speed for a long time duration may be improved.

In the notification system above, the processor is configured or programmed to change a length of the first predetermined time duration in accordance with a number of times by which the first information has been notified to the user.

The length of the first predetermined time duration is changed so that the difficulty for the user to clear the conditions for being notified may be changed.

In the notification system above, the processor is configured or programmed to acquire positional information representing a current position of the bicycle, and change the first predetermined speed in accordance with the current position of the bicycle.

With this arrangement, the conditions for performing the first count operation may be changed in accordance with in what type of region the bicycle is traveling.

In the notification system above, the notifier is included in a mobile terminal device, and the bicycle and the mobile terminal device communicate with each other by wireless communication.

With this arrangement, the mobile terminal device may issue the notification of the first information indicating that the driving has been appropriate. In addition, there is no need to mount the notifier on the bicycle.

In the notification system above, the processor and the storage are included in a mobile terminal device, and the traveling speed information is transmitted from the bicycle to the mobile terminal device by wireless communication.

The mobile terminal device performs the first count operation. With this arrangement, there is no need to mount a device to perform the count operation on the bicycle.

In the notification system above, the traveling speed information is obtained from an output signal from a speed sensor provided in the bicycle.

With this arrangement, the traveling speed of the bicycle may be detected in real time and also at high precision.

In the notification system above, wherein the notifier includes a display, and in the case in which the first state has been continued for the first predetermined time duration, the processor is configured or programmed to cause the display to display at least one of a letter or a graphic pattern indicating that the driving has been appropriate.

With this arrangement, the user looks at the display contents of the display and thus may recognize that he/she has been driving appropriately.

In the notification system above, the notifier includes a sound production component, and in the case in which the first state has been continued for the first predetermined time duration, the processor is configured or programmed to cause the sound production component to output a sound indicating that the driving has been appropriate.

The user hears the sound output by the speaker and thus may recognize that he/she has been driving appropriately.

In the notification system above, the first predetermined speed is about 25 km/h or higher and about 35 km/h or lower.

With this arrangement, the user's awareness to drive at an appropriate traveling speed may be improved.

In the notification system above, the first predetermined time duration is about 30 minutes or longer and about 90 minutes or shorter.

With this arrangement, the user's awareness to keep appropriate driving may be improved.

In the notification system above, the second predetermined time duration is about 5 seconds or longer and about 15 seconds or shorter.

The traveling speed is permitted to be temporarily higher than the first predetermined speed against the user's intention. With this arrangement, the criterion for determining whether or not the traveling speed has been appropriate may be prevented from being excessively strict.

In the notification system above, the second predetermined speed is about 2 km/h or higher and about 5 km/h or lower.

With this arrangement, the time duration in which, for example, the bicycle is at a stop may be prevented from being included in the time duration in which the driving at an appropriate traveling speed is performed.

A notification method for notifying a user of information on driving of a bicycle, the notification method being executable by at least one computer and including acquiring traveling speed information representing a traveling speed of the bicycle; performing a first count operation of counting a time duration in which a first state of the traveling speed not being higher than a first predetermined speed, is continued; and in a case in which the first state has been continued for a first predetermined time duration, notifying the user via a notifier of first information indicating that the driving of the bicycle by the user has been appropriate.

In the case in which the first state of the traveling speed of the bicycle not being higher than the first predetermined speed, has been continued for the first predetermined time duration, the user is notified that the driving has been appropriate. In the case in which the driving is continued at an appropriate traveling speed, the user is praised so that the user's awareness to drive appropriately may be improved.

A non-transitory computer readable medium including a computer program to cause at least one computer to notify a user of information on driving of a bicycle, the computer program causing the at least one computer to acquire traveling speed information representing a traveling speed of the bicycle; perform a first count operation of counting a time duration in which a first state of the traveling speed not being higher than a first predetermined speed, is continued; and in a case in which the first state has been continued for a first predetermined time duration, notify the user via a notifier of first information indicating that the driving of the bicycle by the user has been appropriate.

In the case in which the first state of the traveling speed of the bicycle not being higher than the first predetermined speed, has been continued for the first predetermined time duration, the user is notified that the driving has been appropriate. In the case in which the driving is continued at an appropriate traveling speed, the user is praised so that the user's awareness to drive appropriately may be improved.

According to example embodiments of the present invention, in the case in which the first state of the traveling speed of the bicycle not being higher than the first predetermined speed, has been continued for the first predetermined time duration, the user is notified that the driving has been appropriate. In the case in which the driving is continued at an appropriate traveling speed, the user is praised so that the user's awareness to drive appropriately may be improved.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
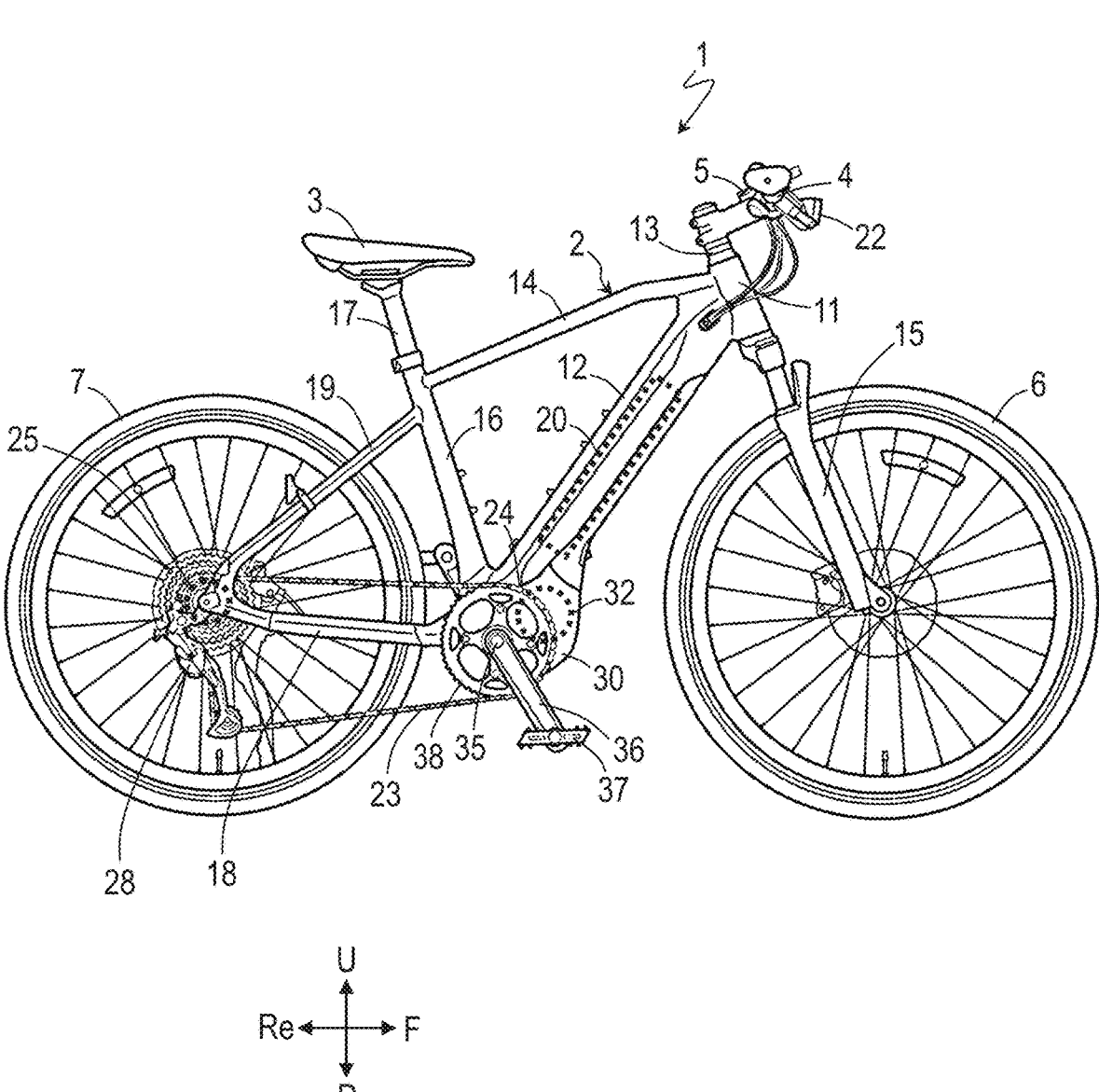
FIG. 1 is a right side view of an electrically assisted bicycle 1 according to an example embodiment of the present invention.

Hereinafter, example embodiments of the present invention will be described with reference to the drawings. In the description of the example embodiments, like elements will bear like reference signs, and overlapping descriptions will be omitted. In the drawings, letters F, Re, L, R, U and D respectively indicate front, rear, left, right, up and down. The "front-rear", "left-right" and "up-down" directions regarding a bicycle respectively indicate front-rear, left-right and up-down directions for a user sitting on a saddle of the bicycle while facing a handle. In the following description, an electrically assisted bicycle will be described as an example of bicycle, but the bicycle according to the present invention is not limited to the electrically assisted bicycle. The bicycle according to an example embodiment of the present invention may be a bicycle that does not have a function of causing an electric motor to assist power of users performing pedaling. The following example embodiments are merely illustrative, and do not limit the present invention in any way.

FIG. 1 is a right side view of an electrically assisted bicycle 1 according to an example embodiment of the present invention. In the following description, the electrically assisted bicycle 1 may also be referred to simply as a "bicycle 1".

The electrically assisted bicycle 1 includes a body frame 2 extending in a front-rear direction. The body frame 2 includes a head pipe 11, a down tube 12, a top tube 14, a seat tube 16, a chain stay 18, a seat stay 19, and a bracket 24. The head pipe 11 is located at a front end of the body frame 2. A handle column 13 is rotatably inserted into the head pipe 11. A handle 4 is secured to the handle column 13. A meter unit 5 displaying various types of information on the electrically assisted bicycle 1 is provided on the handle 4. A head lamp 22 is provided to the front of the handle 4.

A front fork 15 is secured to a bottom end of the handle column 13. A bottom end of the front fork 15 supports a front wheel 6, which is a steering wheel, such that the front wheel 6 is rotatable.

The down tube 12 extends obliquely rearward and downward from the head pipe 11. The seat tube 16 extends upward from a rear end of the down tube 12. The chain stay 18 extends rearward from a bottom end of the seat tube 16. The bracket 24 connects the rear end of the down tube 12, the bottom end of the seat tube 16 and a front end of the chain stay 18 to each other. The top tube 14 connects a top portion of the head pipe 11 and a top portion of the seat tube 16 to each other. A seat post 17 is inserted into the seat tube 16. The saddle 3, on which the user may sit, is provided at a top end of the seat post 17.

A rear end of the chain stay 18 supports a rear wheel 7, which is a driving wheel, such that the rear wheel 7 is rotatable. The seat stay 19 extends obliquely rearward and downward from the top portion of the seat tube 16. A bottom end of the seat stay 19 is connected with the rear end of the chain stay 18. A transmission 28 to change the transmission gear ratio is provided at the rear end of the chain stay 18. The transmission may be provided in the vicinity of a pedal crank shaft 35. A speed sensor 25, which detects the rotation rate of the rear wheel 7, is provided on a rear portion of the chain stay 18. The speed sensor 25 may be provided on a bottom portion of the front fork 15 to detect the rotation rate of the front wheel 6.

The bracket 24 located in the vicinity of a vehicle center of the body frame 2 is provided with a drive unit 30. A housing of the drive unit 30 houses an electric motor 32, an MCU (motor control unit) 31 (see FIG. 3), a decelerator, and the like. The pedal crankshaft 35 is supported by extending through the drive unit 30 in a left-right direction. Crankarms 36 are respectively provided at both of two ends of the pedal crankshaft 35. Pedals 37 are rotatably provided respectively at tips of the crankarms 36.

A battery unit 20 to supply electric power to the drive unit 30 or the like is mounted on the down tube 12. In the example shown in FIG. 1, the battery unit 20 is provided inside the down tube 12. The down tube 12 may be hollow. At least a portion of down tube 12 may have a U-shaped cross-section, and the down tube 12 may be provided with a cover covering the U-shaped portion.

The battery unit 20 may be located on an outer surface of the down tube 12. The battery unit 20 may be mounted on the bracket 24 or the seat tube 16. The battery unit 20 may be detachable from the electrically assisted bicycle 1.

Figure 3:
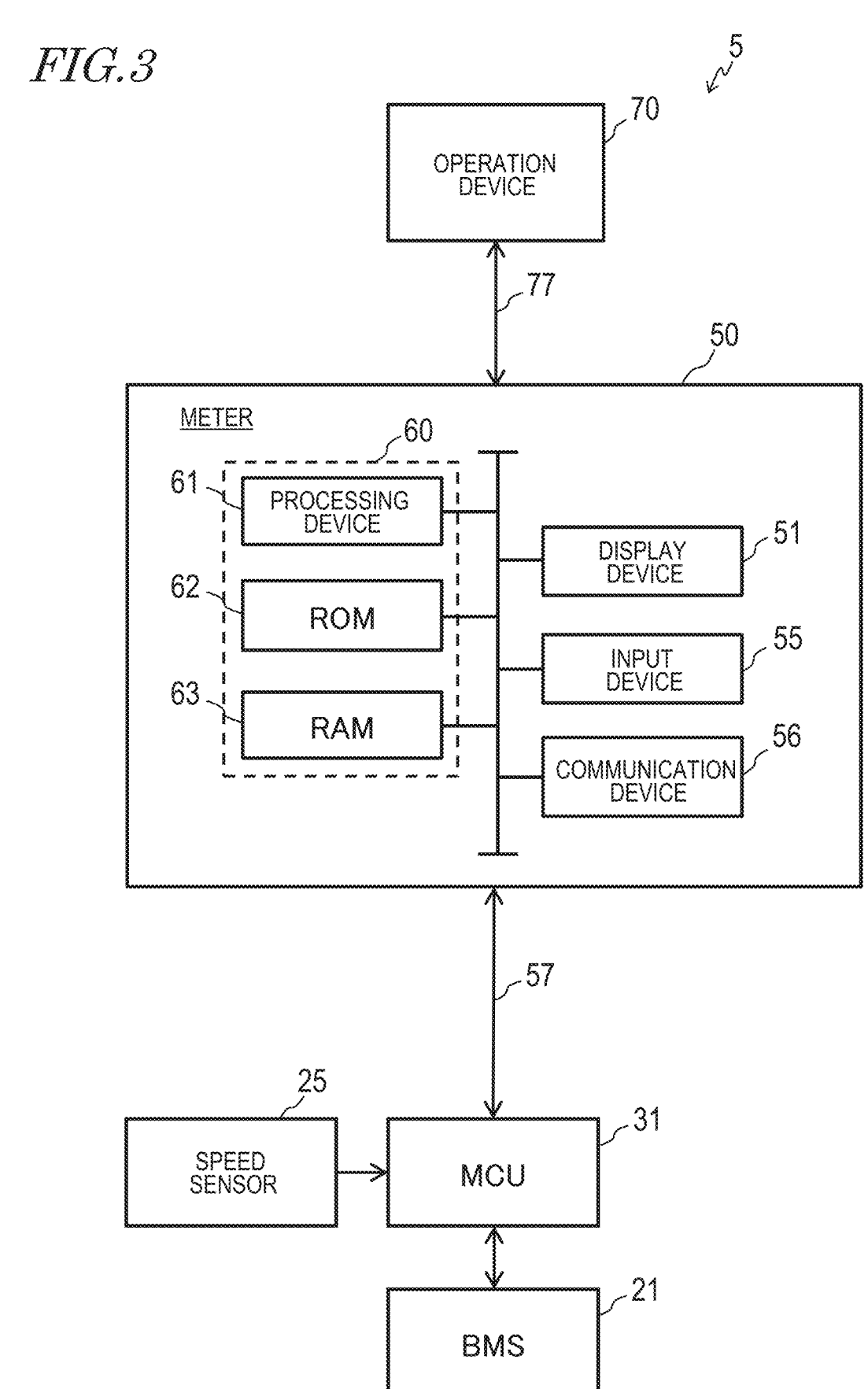
FIG. 3 is a block diagram showing an example of a hardware configuration of a meter 50 according to an example embodiment of the present invention.

The battery unit 20 includes a battery and a BMS (battery management system) 21 (see FIG. 3). The battery is a rechargeable battery. The BMS 21 controls charge/discharge of the battery and monitors an output current, a battery remaining capacity and the like of the battery.

The MCU 31 of the drive unit 30 controls operations of the electric motor 32, and also controls operations of various components of the electrically assisted bicycle 1. The MCU 31 includes a semiconductor integrated circuit such as a processor or the like and a motor driving circuit. A rotation of the pedal crank shaft 35 generated by the user stepping on the pedals 37 is conveyed to the rear wheel 7 via a driving sprocket 38 and a chain 23. The MCU 31 controls the electric motor 32 to generate a driving assisting output corresponding to the rotation output of the pedal crank shaft 35 generated by the user stepping on the pedals 37. Assist power generated by the electric motor 32 is conveyed to the rear wheel 7 via the driving sprocket 38 and the chain 23. Instead of the chain 23, a belt, a shaft or the like may be used.

Figure 2:
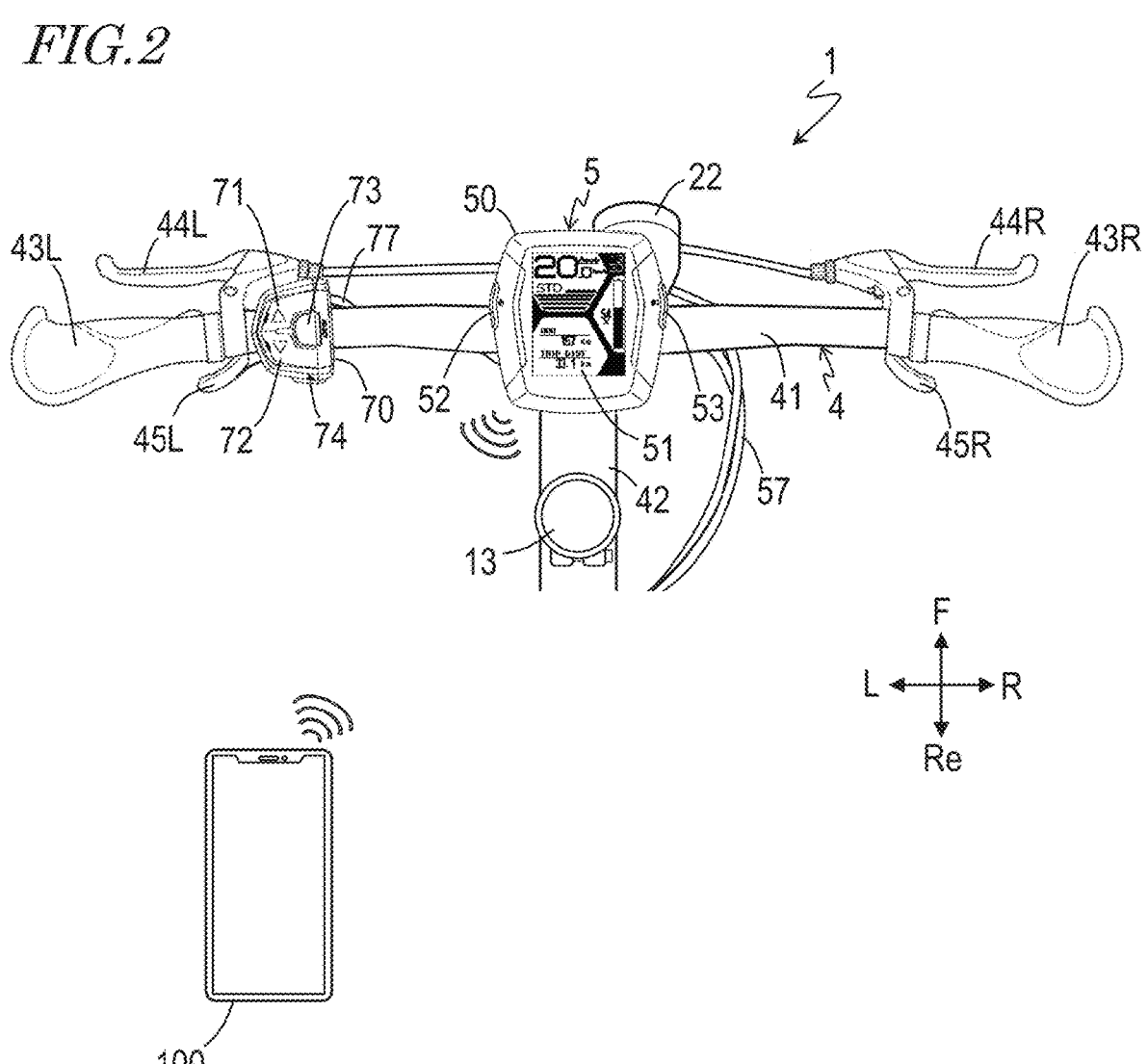
FIG. 2 is a plan view of a front portion of the electrically assisted bicycle 1 according to an example embodiment of the present invention.

FIG. 2 is a top view showing a front portion of the electrically assisted bicycle 1. The handle 4 includes a handle bar 41. A right grip 43R is provided at a right end of the handle bar 41. A left grip 43L is provided at a left end of the handle bar 41. The user grips the right grip 43R and the left grip 43L with his/her hands to steer the electrically assisted bicycle 1.

A front wheel brake lever 44R and a shift controller 45R are provided in the vicinity of the right grip 43R. A rear wheel brake lever 44L and a shift controller 45L are provided in the vicinity of the left grip 43L. When the right grip 43R and the front wheel brake lever 44R are gripped by the right hand of the user, braking power is supplied to the front wheel 6. When the left grip 43L and the rear wheel brake lever 44L are gripped by the left hand of the user, braking power is supplied to the rear wheel 7. The brake lever provided to the left of the handle bar 41 may be the front wheel brake lever supplying the front wheel 6 with the braking power, and the brake lever provided to the right of the handle bar 41 may be the rear wheel brake lever supplying the rear wheel 7 with the braking power. The shift controllers 45R and 45L are also referred as "shifters". The user may switch the transmission ratio by operating the shift controllers 45R and 45L.

The handle bar 41 is provided with the meter unit 5. The meter unit 5 includes the meter 50 and an operation device 70.

The meter 50 displays various types of information about the electrically assisted bicycle 1. The meter 50 is attached to the handle bar 41 or a handle stem 42 by use of an attachment tool such as a clamp or the like.

The operation device 70 is provided in the vicinity of, for example, the left grip 43L of the handle 4. The operation device 70 is attached to the handle bar 41 by use of an attachment tool such as a clamp or the like. The user may operate the operation device 70 with his/her fingers to make an operation of, for example, setting the level of the assist power of the electric motor 32. The meter 50 and the operation device 70 are electrically connected with each other via an electric cable 77. A signal in correspondence with the operation made by the user is sent from the operation device 70 to the meter 50 via the electric cable 77. The meter 50 and the MCU 31 of the drive unit 30 (see FIG. 1) may transfer signals to each other via an electric cable 57. The meter 50 and the operation device 70 may transfer signals to each other wirelessly. The meter 50 and the MCU 31 may transfer signals to each other wirelessly.

The meter 50 includes a display 51 to display various types of information on the electrically assisted bicycle 1 and a plurality of switches 52 and 53 accepting operations of the user. The plurality of switches 52 and 53 are, specifically, a power switch 52 and a lamp light switch 53. In this example embodiment, these switches are push-button switches, which are pushed down by the user with his/her finger to be turned on or off.

The power switch 52 turns on or off the power of the electrically assisted bicycle 1. When the power of the electrically assisted bicycle 1 is on, the drive unit 30 operates, whereas when the power of the electrically assisted bicycle 1 is off, the drive unit 30 does not operate. When the user pushes down the power switch 52 while the power is off, the power is turned on. When the user pushes down the power switch 52 while the power is on, the power is turned off.

The lamp light switch 53 turns the head lamp 22 (FIG. 1) on or off. When the user pushes down the lamp light switch 53 while the head lamp 22 is off to turn the head lamp 22 on, the head lamp 22 emits light and may illuminate the road ahead of the electrically assisted bicycle 1. When the user pushes down the lamp light switch 53 while the head lamp 22 is on, the head lamp 22 is turned off.

The display 51 includes, for example, a liquid crystal panel. The display 51 may display various types of information such as the traveling speed, the traveling distance, the battery remaining capacity, the assist mode and the like. The display 51 may display such information by a segment system or by a dot-matrix system. A display panel other than the liquid crystal panel, for example, an OLED (Organic Light-Emitting Diode) panel or an electronic paper panel may be used.

The operation device 70 includes assist power setting switches 71 and 72, a select switch 73, and a walk switch 74. The assist power setting switches 71 and 72 set the assist power of the electric motor 32. In this example embodiment, the electrically assisted bicycle 1 may be set to any one of a plurality of assist modes. The plurality of assist modes are, for example, an assist-free mode, an ecological mode, a smart mode, and a high mode, in the order from the mode in which the magnitude of the assist power assisting the power of a human body is lowest. In the assist-free mode, the electric motor 32 does not generate any assist power. When the user pushes down the assist power setting switch 71, an assist mode in which the magnitude of the assist power assisting the power of a human body is relatively low is switched to an assist mode in which such a magnitude is relatively higher. When the user pushes down the assist power setting switch 72, an assist mode in which the magnitude of the assist power assisting the power of a human body is relatively high is switched to an assist mode in which such a magnitude is relatively lower.

In the above-described example, there are four different assist modes. Alternatively, there may be three or less assist modes, or five or more assist modes. For example, there may be an assist mode in which larger assist power than that in the high mode is generated, or there may be a plurality of different types of ecological modes.

The select switch 73 switches display contents of the display 51. The user may push down the select switch 73 to switch the display contents of the display 51.

The walk switch 74 accepts, from the user, an instruction to execute a walk mode. In the walk mode, while the user is walking the electrically assisted bicycle 1, the electric motor 32 is caused to generate assist power. The expression "walking the electrically assisted bicycle 1" refers to that the user pushes and moves the bicycle 1 forward without stepping on the pedals 37. In an example of operation of "walking the electrically assisted bicycle 1", the user gets off the bicycle 1 and moves the bicycle 1 forward while walking and pushing the handle 4 with his/her hands.

When the user keeps on pushing down the walk switch 74 while walking the electrically assisted bicycle 1, the electric motor 32 generates assist power. The electric motor 32 is caused to generate assist power while the user is walking the electrically assisted bicycle 1, so that the load on the user may be decreased. For example, when the user is walking up a slope while pushing the bicycle 1 with his/her hands, the load on the user may be decreased.

The meter 50 is wirelessly communicable with the mobile terminal device 100, which may be a smartphone or the like. The wireless communication allows the meter 50 and the mobile terminal device 100 to transfer various types of information to each other.

Now, an example of a hardware configuration of the meter 50 will be described. FIG. 3 is a block diagram showing an example of the hardware configuration of the meter 50.

The meter 50 includes a controller 60, the display 51, an input device 55, and a communication device 56. These components are connected to each other via a bus so as to be communicable with each other.

The controller 60 includes a processor 61 and storage mediums such as, for example, a ROM (Read Only Memory) 62 and a RAM (Random Access Memory) 63. The ROM 62 may store a computer program (or firmware) that causes the processor 61 to execute processes. The computer program may be stored on the ROM 62 at the time of production of the meter 50. The computer program may be provided to the meter 50 via a storage medium (e.g., a semiconductor memory, an optical disc, or the like) or an electric communication line (e.g., the Internet). Such a computer program may be marketed as commercial software.

The processor 61 may be a semiconductor integrated circuit such as a processor or the like, and includes, for example, a central processing unit (CPU). The processor 61 may be realized by a microprocessor or a microcontroller. The processor 61 is configured or programmed to sequentially execute a computer program describing a group of commands that cause various processes to be executed (computer program stored on the ROM 62) to realize a desired process.

The processor 61 may be an FPGA (Field Programmable Gate Array), a GPU (Graphics Processing Unit), an ASIC (Application Specific Integrated Circuit) or an ASSP (Application Specific Standard Product) each having a CPU mounted thereon, or a combination of two or more selected from these circuits.

The ROM 62 is, for example, a writable memory (e.g., a PROM), a rewritable memory (e.g., a flash memory), or a memory only for reading. As described above, the ROM 62 may store a computer program that causes the processor 61 to execute processes. The ROM 62 further stores a computer program to control operations of the processor 61. The ROM 62 does not need to be a single storage medium, and may be an assembly of a plurality of storage mediums. A portion of the plurality of storage mediums may be a detachable memory.

The RAM 63 provides a work area in which the computer program stored on the ROM 62 is once developed at the time of booting. The RAM 63 does need to be a single storage medium, and may be an assembly of a plurality of storage mediums.

The communication device 56 is a communication module that communicates with the mobile terminal device 100 or the like. The communication device 56 may perform wired communication and/or wireless communication. The communication device 56 may perform wired communication compliant to a communication protocol such as, for example, USB, IEEE1394 (registered trademark), Ethernet (registered trademark) or the like. The communication device 56 may perform wireless communication compliant to, for example, the Bluetooth (registered trademark) protocols and/or the Wi-Fi (registered trademark) protocols. Either protocol includes a wireless communication protocol using a frequency of the 2.4 GHz band or the 5.0 GHz band. The communication device 56 may be a communication module capable of performing wireless communication compliant to the BLE (Bluetooth Low Energy) communication system or the LPWA (Low Power Wide Area) communication system. The communication device 56 may perform wireless communication using a mobile phone line or a satellite channel.

The input device 55 accepts operations of the user on, for example, the power switch 52 and the lamp light switch 53 described above. The meter 50 may include a touch panel and/or a microphone as the input device 55.

The processor 61 detects that any of the various switches of the meter 50 and the operation device 70 has been pushed down, and controls operations of the display 51. For example, when the user starts pushing down a switch, the processor 61 detects a voltage value and/or a current value of a predetermined level or higher. When the user finishes pushing down the switch, the processor 61 detects that the voltage value and/or the current value that has been detected so far has become, for example, zero. The processor 61 may detect a plurality of switches being pushed down at the same time, in a parallel manner.

In correspondence with any of the various switches of the meter 50 and the operation device 70 being pushed down, the processor 61 controls the display 51 to change the display contents thereof. The drive unit 30 includes the MCU 31. The processor 61 outputs a signal, in correspondence with the switch pushed down, to the MCU 31. For example, the processor 61 outputs a signal representing the selected assist mode to the MCU 31. Upon receipt of the signal, the MCU 31 controls the electric motor 32 to generate assist power in correspondence with the selected assist mode.

An output signal from the speed sensor 25 is input to the MCU 31. The MCU 31 may calculate a traveling speed of the bicycle 1 based on the output signal from the speed sensor 25. The MCU 31 outputs traveling speed information, representing the traveling speed, to the meter 50. Upon receipt of the traveling speed information, the processor 61 controls the display 51 to display the traveling speed. The output signal from the speed sensor 25 may be directly input to the meter 50 without being once output to the MCU 61.

The BMS 21 is mounted on the battery unit 20. The BMS 21 controls various operations of, for example, charging/discharging the battery unit 20, and monitors various states of the battery unit 20. The BMS 21 monitors the voltage, the current, the temperature, the SOC (State of Charge) and the like of the battery unit 20. The MCU 31 and the BMS 21 transfer necessary information to each other. The MCU 31 receives battery information representing the voltage, the current, the temperature, the SOC and the like of the battery unit 20 from the BMS 21.

The MCU 31 outputs SOC information representing the SOC of the battery unit 20 to the meter 50. The processor 61 controls the display 51 to display information on the battery remaining capacity in accordance with the battery remaining capacity calculated based on the SOC information.

Figure 4:
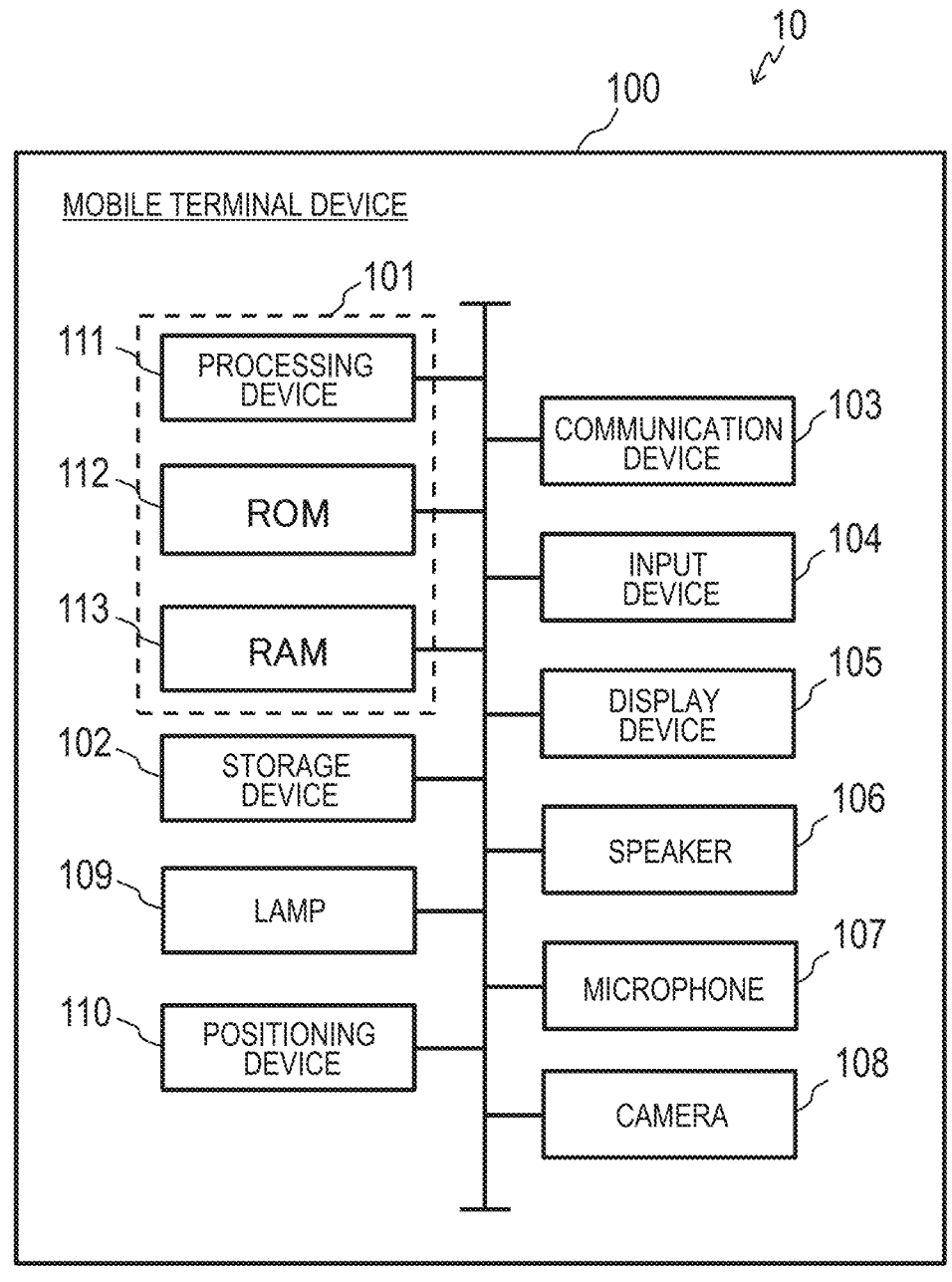
FIG. 4 is a block diagram showing an example of a hardware configuration of a mobile terminal device 100 according to an example embodiment of the present invention.

Now, an example of the hardware configuration of the mobile terminal device 100 will be described. FIG. 4 is a block diagram showing an example of the hardware configuration of the mobile terminal device 100. The mobile terminal device 100 may be, for example, a smartphone or a tablet computer. The mobile terminal device 100 may be a wearable computer such as a smartwatch, smartglasses or the like.

The mobile terminal device 100 is an example of a notification system 10 that notifies the user of information indicating that driving of the electrically assisted bicycle 1 has been appropriate. Operations of the notification system 10 will be described in detail below. Hereinafter, an example in which the mobile terminal device 100 is a smartphone will be described.

The mobile terminal device 100 includes a controller 101, a storage 102, a communication device 103, an input device 104, a display 105, a speaker 106, a microphone 107, a camera 108, a lamp 109, and a positioning device 110. These components are connected to each other via a bus so as to be communicable to each other.

The controller 101 includes a processor 111, a ROM 112, and a RAM 113. An explanation on the processor 111, the ROM 112 and the RAM 113 overlaps the explanation on the processor 61, the ROM 62 and the RAM 63 of the meter 50, and thus will not be repeated.

The storage 102 may be, for example, a semiconductor storage, a magnetic storage, an optical storage, or a combination thereof. An example of the semiconductor storage is a solid state drive (SSD). An example of the magnetic storage is a hard disc drive (HDD). An example of the optical storage is an optical disc drive, a magneto-optic disc (MD) drive or the like.

The communication device 103 is a communication module that communicates with an external device via a communication network. The communication device 103 may perform wireless communication using a mobile phone line or a satellite channel. The mobile terminal device 100 may communicate with the meter 50 by use of the communication device 103. The communication device 103 may perform wired communication and/or wireless communication. The communication device 103 may perform wired communication compliant to a communication protocol such as, for example, USB, IEEE1394 (registered trademark), Ethernet (registered trademark) or the like. The communication device 103 may perform wireless communication compliant to, for example, the Bluetooth (registered trademark) protocols and/or the Wi-Fi (registered trademark) protocols. Either protocol includes a wireless communication protocol using a frequency of the 2.4 GHz band or the 5.0 GHz band. The communication device 103 may be a communication module capable of performing wireless communication compliant to the BLE communication system or the LPWA communication system.

The input device 104 converts an instruction from the user into data and inputs the data to a computer. The input device 104 may be, for example, a touch panel. The mobile terminal device 100 may include, as the input device 104, a push-button switch and/or a microphone. The display 105 includes, for example, a liquid crystal panel, an OLED panel or an electronic paper panel.

The speaker 106 converts an audio signal into a sound and outputs the sound to the outside. The microphone 107 converts a sound around the mobile terminal device 100 into an audio signal. The speaker 106 and the microphone 107 may be used as a voice call device that performs a voice call with another user. The camera 108 captures a portion of an area around the mobile terminal device 100 and generates an image signal. The lamp 109 emits light.

The positioning device 110 may detect the position of the mobile terminal device 100 in a geographical coordinate system (geographical coordinates of the mobile terminal device 100). The positioning device 110 receives a GNSS signal sent from a GNSS satellite and performs positioning based on the GNSS signal. "GNSS" is a collective term of satellite positioning systems including GPS (Global Positioning System), QZSS (Quasi-Zenith Satellite System; for example, Michibiki), GLONASS, Galileo, BeiDou and the like. The positioning method may be any method by which positional information of a necessary level of precision is obtained. The positioning method may be, for example, an interference positioning method or a relative positioning method. The user rides on the electrically assisted bicycle 1 while carrying the mobile terminal device 100, so that the position of the electrically assisted bicycle 1 may be detected.

Now, the notification system 10 that notifies the user of information indicating that driving of the electrically assisted bicycle 1 by the user has been appropriate will be described. The mobile terminal device 100 is an example of the notification system 10. For example, application software that causes the mobile terminal device 100 to operate as the notification system 10 is installed on the mobile terminal device 100, so that the mobile terminal device 100 operates as the notification system 10. The application software may be, for example, downloaded from an external device such as a server or the like via a communication network and installed on the mobile terminal device 100. Such application software may be marketed as commercial software. The application software is, for example, stored on the storage 102 or the ROM 112, and the processor 111 executes an operation of notifying the user of information in accordance with the application software. For example, the processor 111 notifies the user of information indicating that driving of the electrically assisted bicycle 1 by the user has been appropriate.

Figure 5:
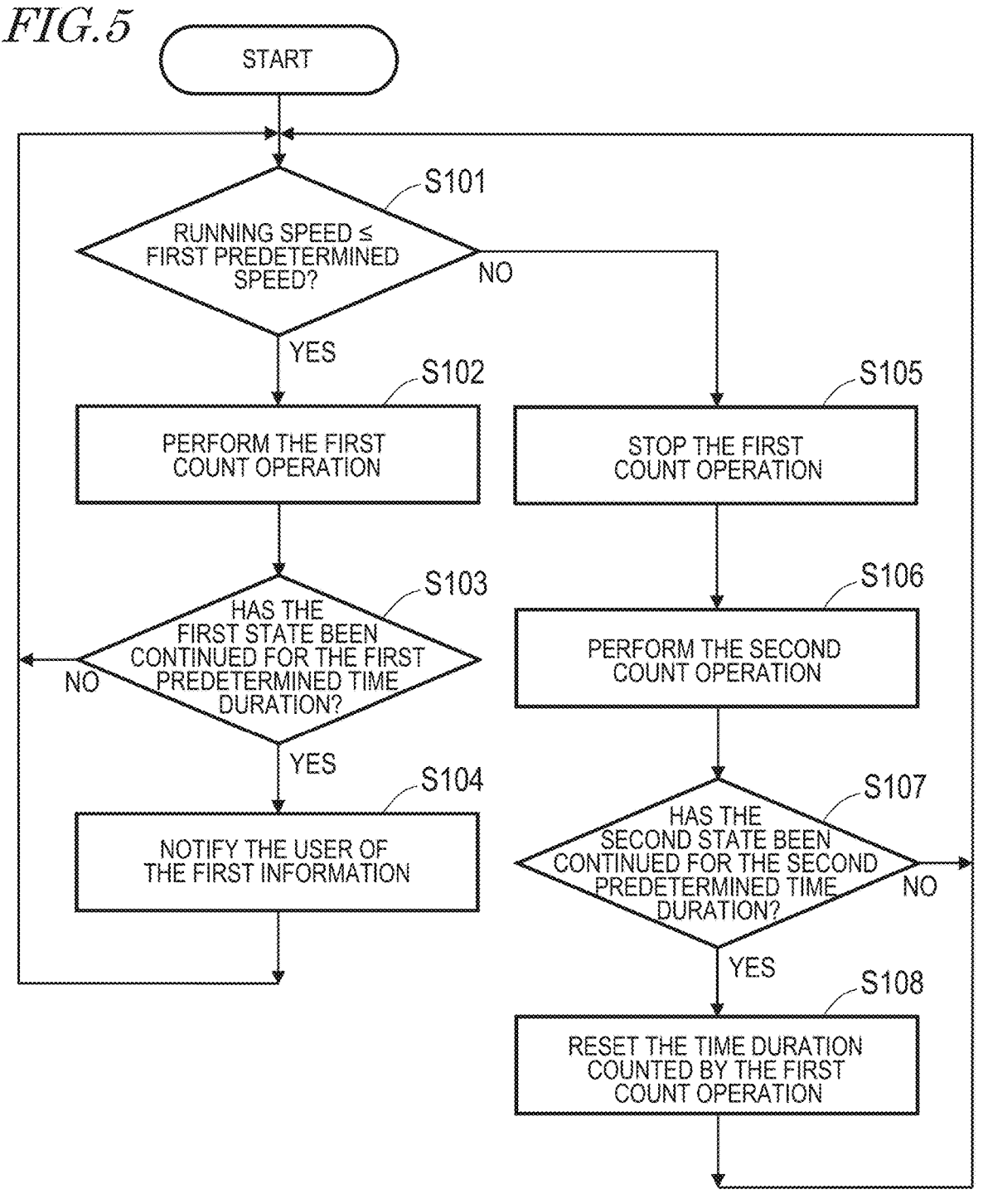
FIG. 5 is a flowchart showing an example of an operation of notifying a user of first information indicating that driving of the electrically assisted bicycle 1 has been appropriate according to an example embodiment of the present invention.

FIG. 5 is a flowchart showing an example of an operation of notifying the user of first information indicating that driving of the electrically assisted bicycle 1 by the user has been appropriate.

As described above, the mobile terminal device 100 and the meter 50 are wirelessly communicable with each other. The mobile terminal device 100 and the meter 50 perform wireless communication compliant to, for example, the Bluetooth (registered trademark) protocol. The mobile terminal device 100 is housed in, for example, a pocket of the user's outfit or a bag of the user.

As described above, the processor 61 of the meter 50 acquires traveling speed information, representing the traveling speed of the electrically assisted bicycle 1, from the MCU 31. An output signal from the speed sensor 25 may be directly input to the meter 50, and the processor 61 may calculate the traveling speed from the output signal from speed sensor 25. The processor 61 sends the traveling speed information representing the traveling speed of the bicycle 1 to the mobile terminal device 100 on a regular basis.

Based on the received traveling speed information, the processor 111 of the mobile terminal device 100 determines whether or not the traveling speed of the bicycle 1 is not higher than a first predetermined speed (step S101). The first predetermined speed is, for example, about 25 km/h or higher and about 35 km/h or lower, but is not limited to a value in this range. In this example, the first predetermined speed is 30 km/h.

In the case in which the traveling speed of the bicycle 1 is not higher than the first predetermined speed, the processor 111 performs a first count operation of counting a time duration in which a first state of the traveling speed not being higher than the first predetermined speed, is continued (step S102). The processor 111 determines whether or not the first state has been continued for a first predetermined time duration (step S103). The first predetermined time duration is, for example, about 30 minutes or longer and about 90 minutes or shorter, but is not limited to a value in such a range. In this example, the first predetermined time duration is 60 minutes.

In the case in which the first state has been continued for the first predetermined time duration, the processor 111 notifies the user of the first information, indicating that the driving of the bicycle 1 by the user has been appropriate, via a notifier (step S104), i.e., the processor 111 notifies the user with a message of encouragement or confirmation that the first state has been continued for the first predetermined time duration.

Figure 6:
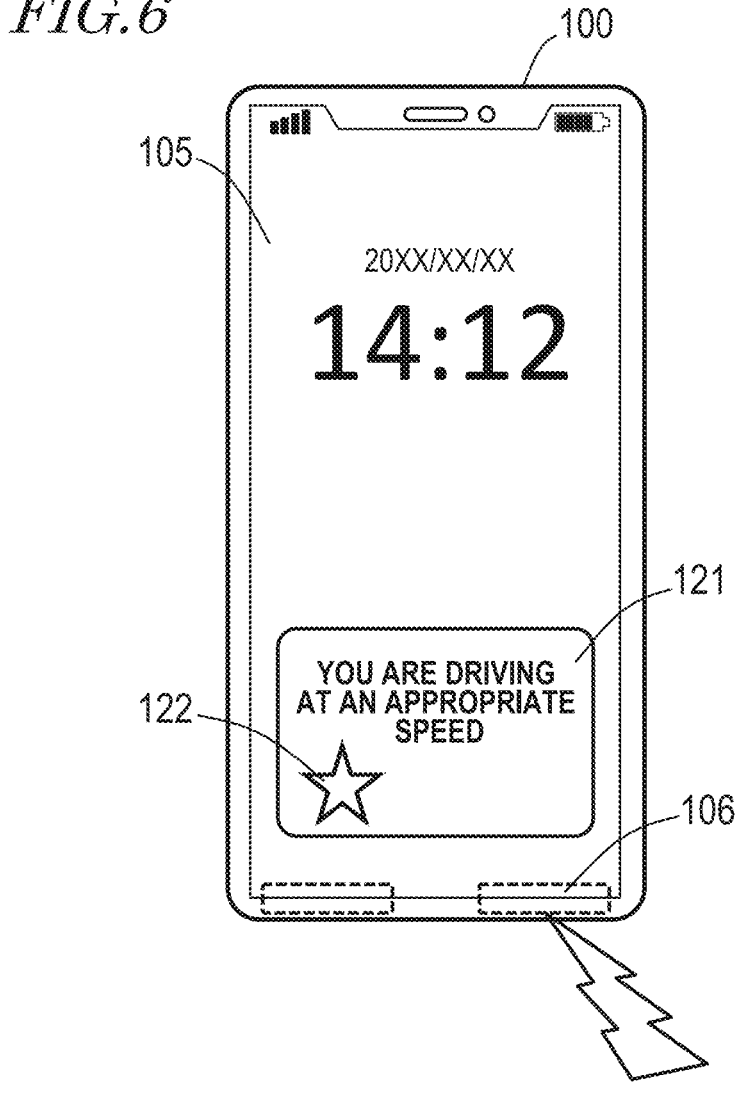
FIG. 6 shows the mobile terminal device 100 notifying the user of the first information according to an example embodiment of the present invention.

FIG. 6 shows an example of the mobile terminal device 100 notifying the user of the first information. The notifier includes, for example, the display 105 and the speaker 106. The speaker 106 is an example of a sound production component.

In the case in which the first state has been continued for the first predetermined time duration, the processor 111 causes the display 105 to display at least one of a letter(s) or a graphic pattern that indicates that the driving has been appropriate. In the example shown in FIG. 6, a popup window 121 is displayed on the display 105, and the letters "You are driving at an appropriate speed" and a star-shaped badge 122 are displayed in the popup window 121. The user looks at display contents of the display 105 and thus may recognize that he/she has been driving appropriately. The user may look at the display contents while, for example, the bicycle 1 is at a stop.

In the case in which the first state has been continued for the first predetermined time duration, the processor 111 causes the speaker 106 to output a voice that indicates that the driving has been appropriate. For example, the voice "You are driving at an appropriate speed" is output from the speaker 106. The user hears the voice output by the speaker 106 and thus may recognize that he/she has been driving appropriately.

In this example embodiment, in the case in which the first state of the traveling speed of the electrically assisted bicycle 1 not being higher than the first predetermined speed, has been continued for the first predetermined time duration, the user is notified that the driving has been appropriate. In the case in which the driving is continued at an appropriate traveling speed, the user is praised, so that the user's awareness to drive appropriately may be improved.

The mobile terminal device 100 issues the notification of the first information indicating that the driving has been appropriate, and therefore, there is no need to mount the notifier on the bicycle 1. This allows the bicycle 1 to have a simple configuration. The mobile terminal device 100 performs the first count operation, and therefore, there is no need to mount a device performing the first count operation on the bicycle 1. This also allows the bicycle 1 to have a simple configuration.

In this example embodiment, the traveling speed information is acquired by use of an output signal from the speed sensor 25 provided in the bicycle 1. This allows the traveling speed of the bicycle 1 to be detected in real time, and also allows the traveling speed to be detected at high precision.

In the above-described example embodiment, both of the display 105 and the speaker 106 notify the first information. Alternatively, either one of the display 105 and the speaker 106 may notify the first information.

The processor 111 notifies the user of the first information, and returns to the process in step S101. In the case in which the first state is maintained, the processor 111 resumes counting the time duration in which the first state is continued. In this case, the processor 111 may reset the time duration counted by the immediately previous first count operation and then resume the first count operation. Alternatively, the processor 111 may resume the first count operation such that a time duration is added to the time duration counted by the immediately previous first count operation. In the case in which the time duration is added to that counted by the immediately previous first count operation, the first predetermined time duration is made longer than the first predetermined time duration in the immediately previous first count operation. For example, the first predetermined time duration is made twice as long as that in the immediately previous first count operation.

The first count operation is resumed after the first information is notified to the user. In this manner, in the case in which the user continues driving at an appropriate traveling speed after being notified of the first information, the first information may be notified to the user again.

In the case of determining in step S101 that the traveling speed of the bicycle 1 is higher than the first predetermined speed, the processor 111 stops the first count operation (step S105). The processor 111 performs a second count operation of counting the time duration in which a second state of the traveling speed not being higher than the first predetermined speed, is continued (step S106).

The processor 111 determines whether or not the second state has been continued for a second predetermined time duration (step S107). The second predetermined time duration is, for example, about 5 seconds or longer and about 15 seconds or shorter, but is not limited to a value in such a range. In this example, the second predetermined time duration is 10 seconds.

In the case in which the second state has been continued for the second predetermined time duration, the processor 111 resets the time duration counted by the first count operation (step S108). In the case in which the second state of the traveling speed of the bicycle 1 being higher than the first predetermined speed, has been continued for the second predetermined time duration, the processor 111 resets the time duration counted by the first count operation. In this manner, in the case in which the appropriate traveling speed is not maintained, the first information may be prevented from being notified. After resetting the time duration counted by the first count operation, the processor 111 returns to the process in step S101.

In the case in which in step S107, the traveling speed is returned to the first predetermined speed or lower without the second state being continued for the second predetermined time duration, the processor 111 returns to the process in step S101 without resetting the time duration counted by the first count operation. In this case, the time duration counted by the second count operation may be reset.

It may occur that the traveling speed is temporarily increased to higher than the first predetermined speed against the user's intention when, for example, the bicycle 1 travels down a slope or has a tailwind. In the case in which the second state did not continue for the second predetermined time duration, the time duration counted by the first count operation is not reset. In this manner, the criterion for determining whether or not the traveling speed has been appropriate may be prevented from being excessively strict.

As in step S105, the first count operation is stopped for the time duration in which the traveling speed is higher than the first predetermined speed. In this manner, the time duration in which the traveling speed is higher than the first predetermined speed may be prevented from being included in the time duration in which the driving is performed at a appropriate traveling speed. In the case in which the traveling speed is returned to the first predetermined speed or lower, the first count operation may be resumed in step S102.

In the case in which the traveling speed is returned to the first predetermined speed or lower after the time duration counted by the first count operation is reset in step S108, the processor 111 may resume the first count operation in step S102. The first count operation is resumed after the counted time duration is reset. In this manner, in the case in which the driving at an appropriate traveling speed has been continued after that, the user may be notified that the driving has been appropriate.

Figure 7:
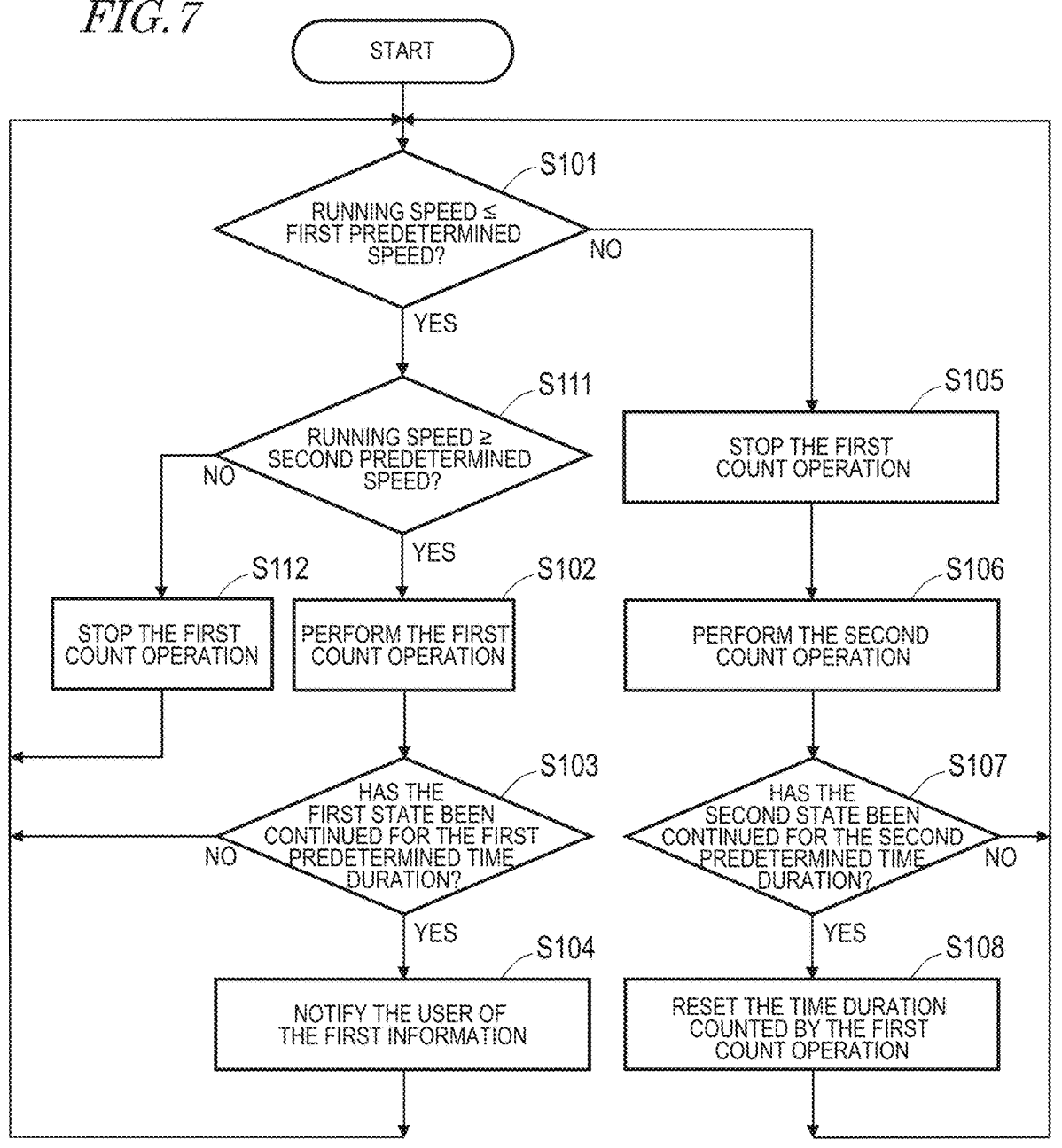
FIG. 7 is a flowchart showing another example of an operation of notifying the user of the first information indicating that driving of the electrically assisted bicycle 1 has been appropriate according to an example embodiment of the present invention.

FIG. 7 is a flowchart showing another example of an operation of notifying the user of the first information indicating that the driving of the electrically assisted bicycle 1 by the user has been appropriate. In a procedure shown in FIG. 7, the first count operation is performed in the case in which the traveling speed of the bicycle 1 is not lower than a second predetermined speed and not higher than the first predetermined speed. In the example shown in FIG. 7, the first state is a state of the traveling speed of the bicycle 1 not being lower than the second predetermined speed and not higher than the first predetermined speed.

In the procedure shown in FIG. 7, in the case of determining in step S101 that the traveling speed is not higher than the first predetermined speed, the processor 111 determines whether or not the traveling speed of the bicycle 1 is not lower than the second predetermined speed (step S111). The second predetermined speed is, for example, about 2 km/h or higher and about 5 km/h or lower, but is not limited to a value in such a range. In this example, the second predetermined speed is about 2 km/h.

In the case in which the traveling speed of the bicycle 1 is not lower than the second predetermined speed, the processor 111 performs the first count operation of counting the time duration in which the first state of the traveling speed not being lower than the second predetermined speed and not higher than the first predetermined speed, is continued (step S102).

In the case in which the traveling speed of the bicycle 1 is lower than the second predetermined speed, the processor 111 stops the first count operation (step S112). If the first count operation is not being performed, the state of the first count operation not being performed is maintained. In the case in which the traveling speed is increased to a speed that is not lower than the second predetermined speed and not higher than the first predetermined speed, the processor 111 performs the first count operation (step S102).

In the case in which the traveling speed is lower than the second predetermined speed, the first count operation is stopped. In this manner, the time duration in which the bicycle 1 is at a stop and the time duration in which the bicycle 1 is regarded as being at a stop may be prevented from being included in the time duration in which the driving at an appropriate traveling speed is performed.

As described above, after notifying the user of the first information in step S104, the processor 111 returns to the process in step S101. The processor 111 resumes the first count operation after notifying the user of the first information. In this manner, in the case in which the user continues driving at an appropriate traveling speed after being notified of the first information, the first information may be notified to the user again.

In this case, the contents of the first information notified at the first time and the contents of the first information notified at an nth time may be made different from each other. n is an integer of 2 or greater.

Figure 8:
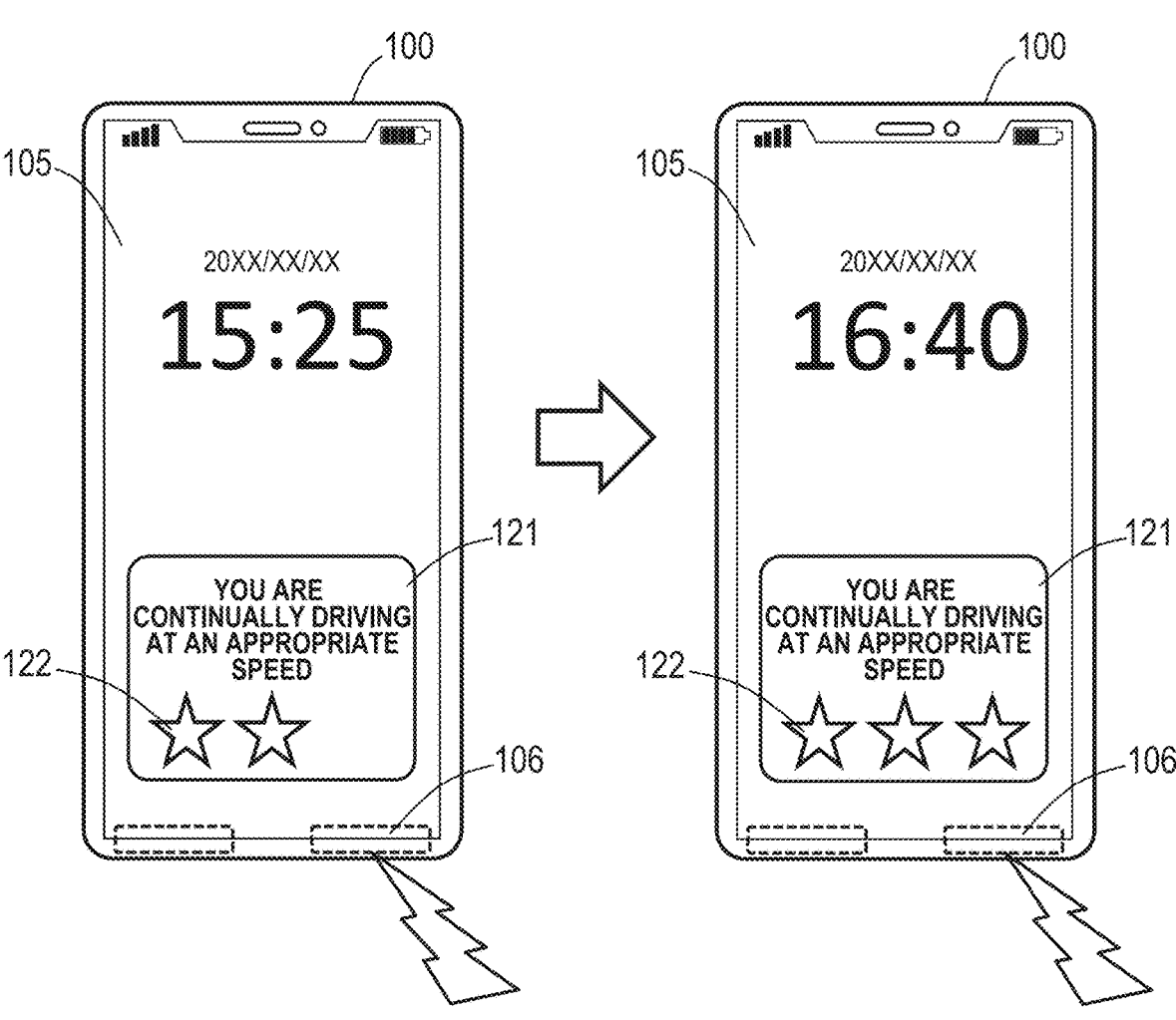
FIG. 8 shows contents of the first information notified to the user at nth times according to an example embodiment of the present invention.

FIG. 8 shows examples of contents of the first information notified to the user at the nth times. In FIG. 8, the left drawing shows an example of contents of the first information notified to the user at the second time, and the right drawing shows an example of contents of the first information notified to the user at the third time.

As compared with the first information notified at the first time shown in FIG. 6, the first information notified at the second time shown in FIG. 8 represents different letters displayed in the popup window 121 and also represents two star-shaped badges 122 instead of one. In the first information notified at the third time, three star-shaped badges 122 are displayed. The contents of the badges 122 may be changed as the number of times of notification increases. For example, a badge 122 shaped like a medal or a crown may be displayed. The contents of the voice output by the speaker 106 may be changed as the number of times of notification increases.

The contents of the first information notified at the nth time are preferably different from the contents of the first information notified at the first time. In this manner, the user's awareness to keep driving at an appropriate traveling speed for a long time duration may be improved.

The length of the first predetermined time duration may be changed in accordance with the number of times of notification to the user. For example, the first predetermined time duration may be made longer as the number of times of notification increases. The length of the first predetermined time duration is changed so that the level of difficulty for the user to clear the conditions for being notified may be changed.

The first predetermined speed may be changed in accordance with the current position of the bicycle 1. The first predetermined speed may be changed in accordance with whether the bicycle 1 is, for example, in a city area, in the mountains, or on a cycling course. In this manner, the conditions for performing the first count operation may be changed in accordance with in what type of region the bicycle 1 is traveling.

The positioning device 110 may detect the geographical coordinates of the mobile terminal device 100. The geographical coordinates of the mobile terminal device 100 correspond to geographical coordinates of the bicycle 1. Map information is stored on the storage 102, and the processor 111 may use the map information to recognize the type of region corresponding to the detected geographical coordinates. The processor 111 may acquire information on the type of region corresponding to the detected geographical coordinates from an external device such as a server or the like via a communication network.

In the above-described example embodiments, the mobile terminal device 100 operates as the notification system 10. Alternatively, the meter 50 may operate as the notification system 10. In this case, the meter 50 includes a notifier notifying the first information, and the various processes shown in FIG. 5 and FIG. 7 may be executed by the processor 61. Alternatively, the various processes shown in FIG. 5 and FIG. 7 may be executed by the processor 61 whereas the notification of the first information to the user may be made by the notifier of the mobile terminal device 100.

In the above-described example embodiments, a two-wheeled bicycle is shown as an example of the bicycle. The present invention is not limited to this. The present invention is also applicable to a bicycle having three or more wheels.

In the above-described example embodiments, the driving wheel to which the power of a human body generated by the user stepping on the pedals and the assist power generated by the electric motor are to be conveyed is the rear wheel. The present invention is not limited to this. The power of the human body and the assist power may be conveyed to the front wheel, or may be conveyed to both of the front wheel and the rear wheel, in accordance with the type of the electrically assisted bicycle. The present invention may be applied to an electrically assisted bicycle including a hub motor on the front wheel.

Illustrative example embodiments of the present invention are described above. The example embodiments disclose notification systems, notification methods, and non-transitory computer readable media including computer programs as described below.

A notification system 10 to notify a user of information on driving of a bicycle 1, the notification system including a processor 111 and a storage 102 to store a computer program to control an operation of the processor 111, wherein the processor 111 is configured or programmed to execute the computer program to acquire traveling speed information representing a traveling speed of the bicycle 1; perform a first count operation of counting a time duration in which a first state of the traveling speed not being higher than a first predetermined speed, is continued, the time duration being counted based on the traveling speed information; and in a case in which the first state has been continued for a first predetermined time duration, notify the user via a notifier 105, 106 of first information indicating that the driving of the bicycle 1 by the user has been appropriate.

In the case in which the first state of the traveling speed of the bicycle 1 not being higher than the first predetermined speed, has been continued for the first predetermined time duration, the user is notified that the driving has been appropriate. In the case in which the driving is continued at an appropriate traveling speed, the user is praised so that the user's awareness to drive appropriately may be improved.

In the notification system 10 above, the processor 111 is configured or programmed to, in the case in which the traveling speed is increased to higher than the first predetermined speed, perform a second count operation of counting a time duration in which a second state of the traveling speed being higher than the first predetermined speed, is continued, and in a case in which the second state has been continued for a second predetermined time duration, which is shorter than the first predetermined time duration, reset the time duration counted by the first count operation.

In the case in which the second state of the traveling speed of the bicycle 1 being higher than the first predetermined speed, has been continued for the second predetermined time duration, the time duration counted by the first count operation is reset. With this arrangement, in the case in which the appropriate traveling speed is not maintained, the first information may be prevented from being notified.

In the notification system 10 above, in the case in which the traveling speed returns to not higher than the first predetermined speed without the second state being continued for the second predetermined time duration, the processor 111 is configured or programmed to not reset the time duration counted by the first count operation.

It may occur that the traveling speed is temporarily increased to higher than the first predetermined speed against the user's intention when, for example, the bicycle 1 travels down a slope or has a tailwind. In the case in which the second state did not continue for the second predetermined time duration, the counted time duration is not reset. With this arrangement, the criterion for determining whether or not the traveling speed has been appropriate may be prevented from being excessively strict.

In the notification system 10 above, the processor 111 is configured or programmed to stop performing the first count operation for a time duration in which the traveling speed is higher than the first predetermined speed, and perform the first count operation when the traveling speed is decreased to not higher than the first predetermined speed.

The first count operation is stopped for the time duration in which the traveling speed is higher than the first predetermined speed. With this arrangement, such a time duration may be prevented from being included in the time duration in which the driving is performed at a appropriate traveling speed.

In the notification system 10 above, the processor 111 is configured or programmed to stop performing the first count operation for a time duration in which the traveling speed is lower than a second predetermined speed, which is lower than the first predetermined speed, and perform the first count operation when the traveling speed is increased to not lower than the second predetermined speed and not higher than the first predetermined speed.

The first count operation is stopped for the time duration in which the traveling speed is lower than the second predetermined speed. With this arrangement, the time duration in which, for example, the bicycle 1 is at a stop may be prevented from being included in the time duration in which the driving is performed at an appropriate traveling speed.

In the notification system 10 above, after resetting the time duration counted by the first count operation, the processor 111 is configured or programmed to resume counting the time duration in which the first state is continued.

The count operation is resumed after the counted time duration is reset. With this arrangement, in the case in which the user continues driving at an appropriate traveling speed after that, the user may be notified that the driving has been appropriate.

In the notification system 10 above, after notifying the user of the first information via the notifier 105, 106, the processor 111 is configured or programmed to resume counting the time duration in which the first state is continued.

The count operation is resumed after the first information is notified to the user. With this arrangement, in the case in which the user continues driving at an appropriate traveling speed after being notified of the first information, the first information may be notified to the user again.

In the notification system 10 above, the processor 111 is configured or programmed to make contents of the first information notified to the user at a first time and contents of the first information notified to the user at an nth time different from each other, where n is an integer of 2 or greater.

The contents of the information notified at the nth time are made different from the contents of the information notified at the first time. With this arrangement, the user's awareness to keep driving at an appropriate traveling speed for a long time duration may be improved.

In the notification system 10 above, the processor 111 is configured or programmed to change a length of the first predetermined time duration in accordance with a number of times by which the first information has been notified to the user.

The length of the first predetermined time duration is changed so that the level of difficulty for the user to clear the conditions for being notified may be changed.

In the notification system 10 above, the processor 111 is configured or programmed to acquire positional information representing a current position of the bicycle 1, and change the first predetermined speed in accordance with the current position of the bicycle 1.

With this arrangement, the conditions for performing the first count operation may be changed in accordance with in what type of region the bicycle 1 is traveling.

In the notification system 10 above, the notifier 105, 106 is included in a mobile terminal device 100, and the bicycle 1 and the mobile terminal device 100 communicate with each other by wireless communication.

With this arrangement, the mobile terminal device 100 may make the notification of the first information indicating that the driving has been appropriate. There is no need to mount the notifier 105, 106 on the bicycle 1.

In the notification system 10 above, the processor 111 and the storage 102 are included in a mobile terminal device 100, and the traveling speed information is sent from the bicycle 1 to the mobile terminal device 100 by wireless communication.

The mobile terminal device 100 performs the first count operation. With this arrangement, there is no need to mount a device performing the count operation on the bicycle 1.

In the notification system 10 above, the traveling speed information is obtained from an output signal from a speed sensor 25 provided in the bicycle 1.

With this arrangement, the traveling speed of the bicycle 1 may be detected in real time and also at high precision.

In the notification system 10 above, the notifier includes a display 105, and in the case in which the first state has been continued for the first predetermined time duration, the processor 111 is configured or programmed to cause the display 105 to display at least one of a letter or a graphic pattern indicating that the driving has been appropriate.

With this arrangement, the user looks at the display contents of the display 105 and thus may recognize that he/she has been driving appropriately.

In the notification system 10 above, the notifier includes a sound production component 106, and in the case in which the first state has been continued for the first predetermined time duration, the processor 111 is configured or programmed to cause the sound production component 106 to output sound indicating that the driving has been appropriate.

With this arrangement, the user hears the sound output by the speaker 106 and thus may recognize that he/she has been driving appropriately.

In the notification system 10 above, the first predetermined speed is about 25 km/h or higher and about 35 km/h or lower.

With this arrangement, the user's awareness to drive at an appropriate traveling speed may be improved.

In the notification system 10 above, the first predetermined time duration is about 30 minutes or longer and about 90 minutes or shorter.

With this arrangement, the user's awareness to keep appropriate driving may be improved.

In the notification system 10 above, the second predetermined time duration is about 5 seconds or longer and about 15 seconds or shorter.

The traveling speed is permitted to be temporarily higher than the first predetermined speed against the user's intention. With this arrangement, the criterion for determining whether or not the traveling speed has been appropriate may be prevented from being excessively strict.

In the notification system 10 above, the second predetermined speed is about 2 km/h or higher and about 5 km/h or lower.

With this arrangement, the time duration in which, for example, the bicycle 1 is at a stop may be prevented from being included in the time duration in which the driving at an appropriate traveling speed is performed.

A notification method for notifying a user of information on driving of a bicycle 1, the notification method being executable by at least one computer and including acquiring traveling speed information representing a traveling speed of the bicycle 1; performing a first count operation of counting a time duration in which a first state of the traveling speed not being higher than a first predetermined speed, is continued; and in a case in which the first state has been continued for a first predetermined time duration, notifying the user via a notifier 105, 106 of first information indicating that the driving of the bicycle 1 by the user has been appropriate.

In the case in which the first state of the traveling speed of the bicycle 1 not being higher than the first predetermined speed, has been continued for the first predetermined time duration, the user is notified that the driving has been appropriate. In the case in which the driving is continued at an appropriate traveling speed, the user is praised so that the user's awareness to drive appropriately may be improved.

A non-transitory computer readable medium including a computer program to cause at least one computer to notify a user of information on driving of a bicycle 1, the computer program causing the at least one computer to acquire traveling speed information representing a traveling speed of the bicycle 1; perform a first count operation of counting a time duration in which a first state of the traveling speed not being higher than a first predetermined speed, is continued; and in a case in which the first state has been continued for a first predetermined time duration, notify the user via a notifier 105, 106 of first information indicating that the driving of the bicycle 1 by the user has been appropriate.

In the case in which the first state of the traveling speed of the bicycle 1 not being higher than the first predetermined speed, has been continued for the first predetermined time duration, the user is notified that the driving has been appropriate. In the case in which the driving is continued at an appropriate traveling speed, the user is praised so that the user's awareness to drive appropriately may be improved.

Example embodiments of the present invention are especially useful in the fields of notification systems for vehicles such as bicycles.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A notification system for notifying a user of information on driving of a bicycle, the notification system comprising:

a processor; and a storage to store a computer program to control an operation of the processor; wherein the processor is configured or programmed to execute the computer program to:

acquire traveling speed information representing a traveling speed of the bicycle;

perform a first count operation of counting a time duration in which a first state of the traveling speed not being higher than a first predetermined speed, is continued; and in a case in which the first state has been continued for a first predetermined time duration, notify the user via a notifier of first information indicating that the driving of the bicycle by the user has been appropriate.

2. The notification system of claim 1, wherein the processor is configured or programmed to:

in a case in which the traveling speed is increased higher than the first predetermined speed, perform a second count operation of counting a time duration in which a second state of the traveling speed being higher than the first predetermined speed, is continued; and in a case in which the second state has been continued for a second predetermined time duration, which is shorter than the first predetermined time duration, reset the time duration counted by the first count operation.

3. The notification system of claim 2, wherein in a case in which the traveling speed returns to a speed not higher than the first predetermined speed without the second state being continued for the second predetermined time duration, the processor is configured or programmed to not reset the time duration counted by the first count operation.

4. The notification system of claim 2, wherein the processor is configured or programmed to:

stop performing the first count operation for a time duration in which the traveling speed is higher than the first predetermined speed; and perform the first count operation when the traveling speed is decreased to a speed not higher than the first predetermined speed.

5. The notification system of claim 1, wherein the processor is configured or programmed to:

stop performing the first count operation for a time duration in which the traveling speed is lower than a second predetermined speed, which is lower than the first predetermined speed; and perform the first count operation when the traveling speed is increased to a speed not lower than the second predetermined speed and not higher than the first predetermined speed.

6. The notification system of claim 2, wherein after resetting the time duration counted by the first count operation, the processor is configured or programmed to resume counting the time duration in which the first state is continued.

7. The notification system of claim 1, wherein after notifying the user via the notifier of the first information, the processor is configured or programmed to resume counting the time duration in which the first state is continued.

8. The notification system of claim 7, wherein the processor is configured or programmed to make contents of the first information notified at a first time and contents of the first information notified at an nth time different from each other, where n is an integer of 2 or greater.

9. The notification system of claim 7, wherein the processor is configured or programmed to change a length of the first predetermined time duration in accordance with a number of times by which the first information has been notified to the user.

10. The notification system of claim 1, wherein the processor is configured or programmed to:

acquire positional information representing a current position of the bicycle; and change the first predetermined speed in accordance with the current position of the bicycle.

11. The notification system of claim 1, wherein the notifier is included in a mobile terminal device; and the bicycle and the mobile terminal device communicate with each other by wireless communication.

12. The notification system of claim 1, wherein the processor and the storage are included in a mobile terminal device; and the traveling speed information is transmitted from the bicycle to the mobile terminal device by wireless communication.

13. The notification system of claim 1, wherein the traveling speed information is obtained from an output signal from a speed sensor provided in the bicycle.

14. The notification system of claim 1, wherein the notifier includes a display; and in the case in which the first state has been continued for the first predetermined time duration, the processor is configured or programmed to cause the display to display at least one of a letter or a graphic pattern indicating that the driving has been appropriate.

15. The notification system of claim 1, wherein the notifier includes a sound production component; and in the case in which the first state has been continued for the first predetermined time duration, the processor is configured or programmed to cause the sound production component to output a sound indicating that the driving has been appropriate.

16. The notification system of claim 1, wherein the first predetermined speed is about 25 km/h or higher and about 35 km/h or lower.

17. The notification system of claim 1, wherein the first predetermined time duration is about 30 minutes or longer and about 90 minutes or shorter.

18. The notification system of claim 2, wherein the second predetermined time duration is about 5 seconds or longer and about 15 seconds or shorter.

19. The notification system of claim 5, wherein the second predetermined speed is about 2 km/h or higher and about 5 km/h or lower.

20. A notification method for notifying a user of information on driving of a bicycle, the notification method being executable by at least one computer and comprising:

acquiring traveling speed information representing a traveling speed of the bicycle;

performing a first count operation of counting a time duration in which a first state of the traveling speed not being higher than a first predetermined speed, is continued; and in a case in which the first state has been continued for a first predetermined time duration, notifying the user via a notifier of first information indicating that the driving of the bicycle by the user has been appropriate.

21. A non-transitory computer readable medium including a computer program to cause at least one computer to notify a user of information on driving of a bicycle, the computer program causing the at least one computer to:

acquire traveling speed information representing a traveling speed of the bicycle;

perform a first count operation of counting a time duration in which a first state of the traveling speed not being higher than a first predetermined speed, is continued; and in a case in which the first state has been continued for a first predetermined time duration, notify the user via a notifier of first information indicating that the driving of the bicycle by the user has been appropriate.

* * * * *